(12) United States Patent
Wu et al.

(10) Patent No.: US 10,862,792 B2
(45) Date of Patent: Dec. 8, 2020

(54) TRANSMITTING BGP MESSAGE

(71) Applicant: NEW H3C TECHNOLOGIES CO., LTD., Zhejiang (CN)

(72) Inventors: Wen Wu, Beijing (CN); Liang Wang, Beijing (CN); Yuelei Chao, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/342,897

(22) PCT Filed: Oct. 13, 2017

(86) PCT No.: PCT/CN2017/106020
§ 371 (c)(1),
(2) Date: Apr. 17, 2019

(87) PCT Pub. No.: WO2018/072642
PCT Pub. Date: Apr. 26, 2018

(65) Prior Publication Data
US 2019/0245771 A1 Aug. 8, 2019

(30) Foreign Application Priority Data
Oct. 17, 2016 (CN) .......................... 2016 1 0905318

(51) Int. Cl.
*H04L 12/751* (2013.01)
*H04L 12/867* (2013.01)
(Continued)

(52) U.S. Cl.
CPC .............. *H04L 45/02* (2013.01); *H04L 45/60* (2013.01); *H04L 47/629* (2013.01); *H04L 49/90* (2013.01); *H04L 45/04* (2013.01)

(58) Field of Classification Search
CPC ....... H04L 45/02; H04L 45/60; H04L 47/629; H04L 49/90; H04L 45/04
See application file for complete search history.

(56) References Cited

U.S. PATENT DOCUMENTS 6,728,779 B1 * 4/2004 Griffin .................... H04L 45/02
370/469
6,910,148 B1 * 6/2005 Ho .......................... H04L 45/00
714/4.4
(Continued)

FOREIGN PATENT DOCUMENTS

| CN | 1595931 A | 3/2005 |
|---|---|---|
| CN | 101692657 A | 4/2010 |

(Continued)

OTHER PUBLICATIONS

Juniper Networks: "Release Notes: Junos OS Release 16.IRI for the EX Series, MX Series, PTX Series, QFX Series, T Series, and Junos Fusion Junos OS Release 16.IRI", Sep. 1, 2016, XP055601083.

(Continued)

*Primary Examiner* — Duc C Ho
(74) *Attorney, Agent, or Firm* — Hauptman Ham, LLP

(57) ABSTRACT

A method of transmitting a BGP message and a routing device are provided. According to an example of the method, a queue for holding BGP messages to be transmitted is partitioned into more than two subqueues according to types of BGP routes, where each of the subqueues is used to hold a BGP message carrying a corresponding type of BGP route. A BGP message carrying a BGP route to be advertised is placed into one of the more than two subqueues according to the type of the BGP route. A target subqueue is selected from the more than two subqueues according to a first scheduling algorithm, and a BGP message in the target subqueue is transmitted.

14 Claims, 2 Drawing Sheets

(51) Int. Cl.
    *H04L 12/773*    (2013.01)
    *H04L 12/861*    (2013.01)
    *H04L 12/715*    (2013.01)

(56) References Cited

U.S. PATENT DOCUMENTS

| | | | |
|---|---|---|---|
| 8,320,378 B2 | 11/2012 | Nalawade | |
| 8,948,008 B2 | 2/2015 | Narayanan | |
| 2003/0140155 A1* | 7/2003 | Harvey | H04L 69/16 709/230 |
| 2006/0023750 A1* | 2/2006 | Kim | H04L 49/30 370/473 |
| 2007/0258376 A1 | 11/2007 | Li | |

FOREIGN PATENT DOCUMENTS

| | | |
|---|---|---|
| CN | 101820645 A | 9/2010 |
| CN | 102546369 A | 7/2012 |
| EP | 2658184 A1 | 10/2013 |
| JP | 2011045007 A | 3/2011 |
| JP | 2011109587 A | 6/2011 |
| JP | 2014504100 A | 2/2014 |

OTHER PUBLICATIONS

European Patent Office, Extended European Search Report Issued in Application No. 17862404.5, dated Jul. 8, 2019, Germany, 8 pages.
ISA State Intellectual Property Office of the People's Republic of China, Written Opinion of the International Searching Authority Issued in Application No. PCT/CN2017/106020, dated Dec. 5, 2017, WIPO, 3 pages.
ISA State Intellectual Property Office of the People's Republic of China, International Search Report Issued in Application No. PCT/CN2017/106020, dated Dec. 5, 2017, WIPO, 4 pages.
State Intellectual Property Office of the People's Republic of China, Office Action and Search Report Issued in Application No. 2016109053183, dated Nov. 28, 2019, 10 pages.
Japanese Patent Office, Office Action Issued in Application No. 2019-520589, dated Feb. 18, 2020, 6 pages.
State Intellectual Property Office of the People's Republic of China, Office Action and Search Report Issued in Application No. 2016109053183, dated Aug. 18, 2020, 7 pages, (Submitted with Machine Translation).

* cited by examiner

TRANSMITTING BGP MESSAGE

RELATED APPLICATIONS

The present application is a National Phase of International Application Number PCT/CN2017/106020, filed Oct. 13, 2017, and claims the priority of China Application No. 201610905318.3, filed Oct. 17, 2016.

CROSS REFERENCE TO RELATED APPLICATION

This application claims priority to Chinese Patent Application No. 201610905318.3 entitled "METHOD AND APPARATUS FOR TRANSMITTING BGP MESSAGE" filed on Oct. 17, 2016, the entire content of which is incorporated herein by reference.

BACKGROUND

Border Gateway Protocol (BGP) is a dynamic routing protocol used between Autonomous Systems (ASs).

Two routing devices may advertise BGP routes to each other via Update messages when a BGP neighbor relationship is established therebetween, so that the peer routing devices may forward data streams according to the BGP routes. For example, a routing device R1 may place an Update message carrying a BGP route to be advertised to a routing device R2 into a corresponding queue for being transmitted to the routing device R2 when the routing device R1 establishes the BGP neighbor relationship with the routing device R2.

Subsequently, the routing device R1 may further established the BGP neighbor relationship with a routing device R3, and the routing device R1 may then place an Update message carrying a BGP route to be advertised to the routing device R3 into the same queue for being transmitted to the routing device R3.

DETAILED DESCRIPTION OF THE EMBODIMENTS

Figure 1:
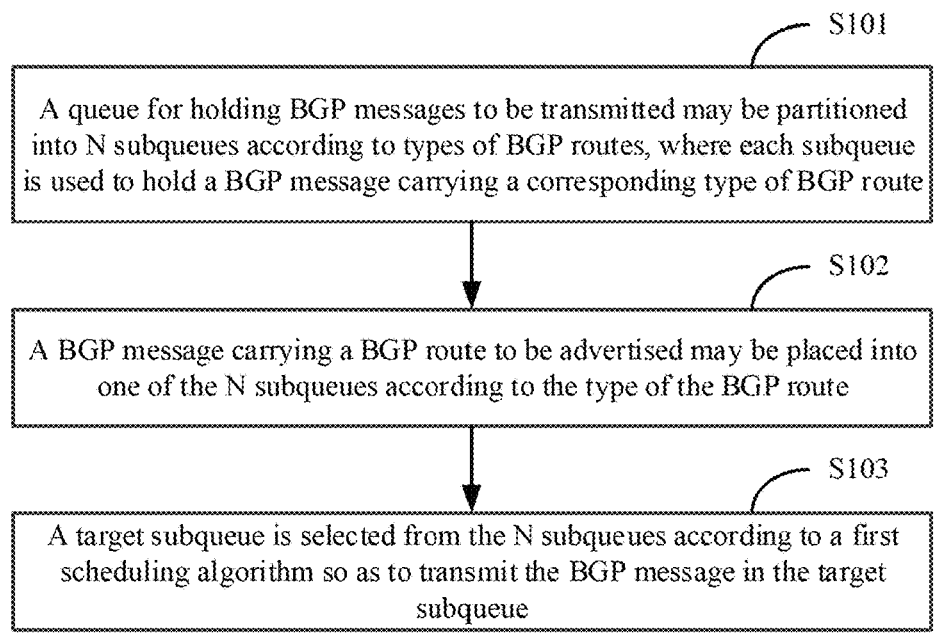
FIG. 1 illustrates a flow diagram of a method of transmitting a BGP message according to an exemplary example of the present disclosure.

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular foul's such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

A router to transmit a BGP message is called a BGP speaker which receives or generates new route information and advertises it to other BGP speakers. When a BGP speaker receives new route information from other AS, the BGP speaker may advertise this route information to all other BGP speakers in the AS where the BGP speaker locates if the route information is superior to the currently known route information or the route information is not currently available. The BGP speakers which exchange messages with each other are mutually referred to as peers.

There are five BGP message types: Open, Update, Notification, Keepalive and Route-refresh. The Update message is used for route exchange between BGP peers, for example, to advertise a reachable route or withdraw an unreachable route. The Route-refresh message is used to require a BGP peer to re-transmit route information of a specified address family.

For example, the routing device R1 may transmit BGP messages to its neighbor routing devices R2 and R3, respectively. Due to a single queue for holding the BGP messages to be transmitted, the Update message to be transmitted to the routing device R2 and the Update message to be transmitted to the routing device R3 are placed into the same queue. Accordingly, when a Central Processing Unit (CPU) of the routing device R1 is under a large load, the CPU may take a long time to complete processing of the Update message to be transmitted to the routing device R2 before it can start to process the Update message to be transmitted to the routing device R3. Thus, the routing device R1 cannot advertise BGP routes to the routing device R3 in time, resulting in that the routing device R3 does not receive the BGP routes in time and thus fails to forward data stream according to such BGP routes.

In the following example of the present disclosure, a method of transmitting a BGP message is provided. The method may be executed by a BGP speaker or a BGP peer. In addition, since only an Update message and a Route-refresh message among the five BGP message types can carry BGP routes, the BGP messages in the following example of the present disclosure refer to Update message and/or Route-refresh message.

As shown in FIG. 1, the method of transmitting a BGP message according to an example of the present disclosure includes the following blocks.

At block S101, a queue for holding BGP messages to be transmitted may be partitioned into N subqueues according to types of BGP routes, where each subqueue is used to hold a BGP message carrying a corresponding type of BGP route, and N is a positive integer greater than or equal to 2.

At block S102, a BGP message carrying a BGP route to be advertised may be placed into one of the N subqueues according to the type of the BGP route.

At block S103, a target subqueue is selected from the N subqueues according to a first scheduling algorithm so as to transmit the BGP message in the target subqueue.

Common queue scheduling algorithms mainly include: a Strict Priority (SP) scheduling algorithm, a weight-based scheduling algorithm, etc. Such scheduling algorithms will be briefly introduced below, respectively.

For the SP scheduling algorithm, different queues have different priorities. A queue having a higher priority may be scheduled first strictly in accordance with a priority descending order. When the queue having a higher priority is empty, a queue having a lower priority may be scheduled.

For the weight-based scheduling algorithm, each queue has a corresponding weight, and different queues are scheduled in sequence according to the corresponding weights. For example, the ratio of the scheduling weights of queue 0 to queue 3 is 1:2:3:4; then, one message is fetched from the queue 0 when the queue 0 is scheduled; two messages are fetched from the queue 1 when the queue 1 is scheduled; three messages are fetched from the queue 2 when the queue 2 is scheduled; and four messages are fetched from the queue 3 when the queue 3 is scheduled. Typical weight-based scheduling algorithms include a Round Robin (RR) scheduling algorithm, a Weighted Round Robin (WRR) scheduling algorithm, a token scheduling algorithm, etc.

Thus, the first scheduling algorithm may be any one of the above-mentioned common scheduling algorithms.

In the method according to an example of the present disclosure, a queue for holding the BGP messages to be transmitted may be partitioned in advance into a plurality of subqueues, and each subqueue is used to hold a BGP message carrying a corresponding type of BGP route. In this way, when a BGP route is to be advertised, a BGP message carrying the BGP route may be placed into the corresponding subqueue according to the type of the BGP route. During queue scheduling, different subqueues are scheduled according to a particular scheduling algorithm. For example, a target subqueue may be selected from the subqueues according to the scheduling algorithm, and the BGP message in the target subqueue is then transmitted. Thus, a scheduling and transmitting sequence of different types of BGP routes can be distinguished by using a simple multi-queue scheduling mechanism, and the BGP routes required to be advertised as quickly as possible can be transmitted in time. Thus, a peer device may receive the BGP routes in time and then forward data streams in time according to the BGP routes.

Additionally, in the method according to an example of the present disclosure, more than two subqueues of the above-mentioned N subqueues may be further classified into one subqueue group, and different subqueues in the subqueue group are scheduled according to a second scheduling algorithm during queue scheduling. In this way, partial subqueues may be scheduled using the second scheduling algorithm at the same time of scheduling the N subqueues using the first scheduling algorithm. For example, when partial subqueues of the above-mentioned N subqueues have the same priority, such subqueues are classified into one subqueue group; then, the above-mentioned N subqueues are scheduled using the SP scheduling algorithm, and different subqueues in the subqueue group are scheduled using the weight-based scheduling algorithm. Thus, it is realized by grouping that partial subqueues are scheduled using another scheduling algorithm on the basis of scheduling all the subqueues using one scheduling algorithm, providing richer and more flexible scheduling manners.

Figure 2:
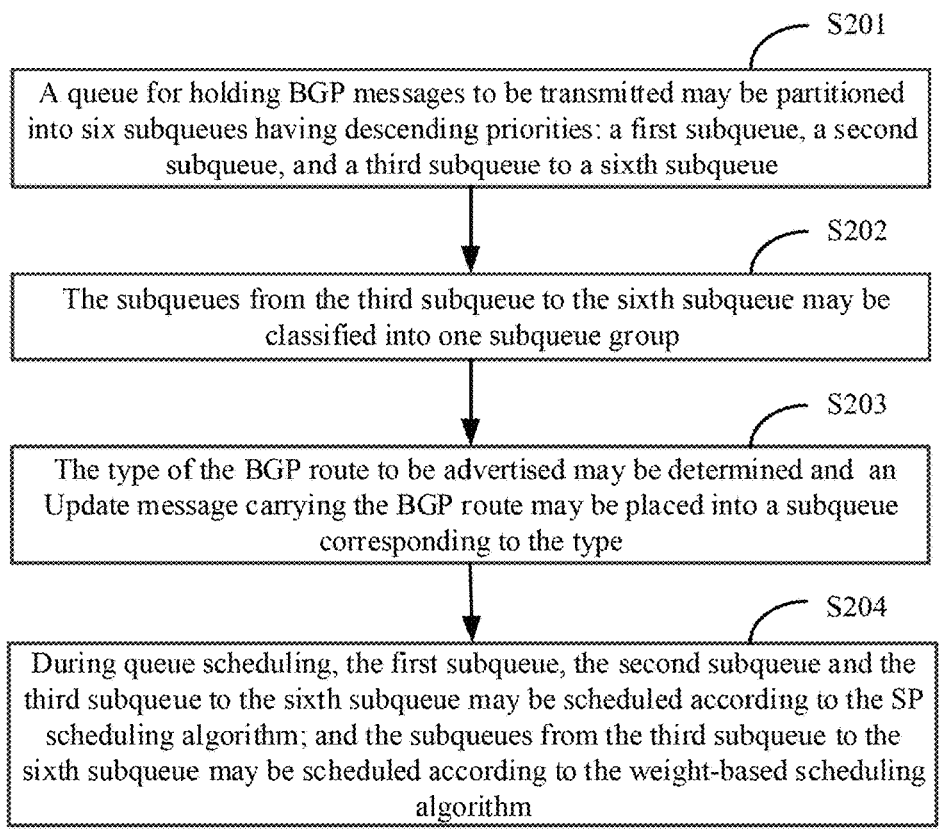
FIG. 2 illustrates a flow diagram of a method of transmitting an Update message according to an exemplary example of the present disclosure.

The following description is made with an example where the above-mentioned BGP messages are the Update messages, and the first scheduling algorithm is the SP scheduling algorithm, and the second scheduling algorithm is the weight-based scheduling algorithm. As shown in FIG. 2, the method of transmitting a BGP message is as follows.

At block S201, a routing device may partition a queue for holding BGP messages to be transmitted into six subqueues having descending priorities: a first subqueue, a second subqueue, and a third subqueue to a sixth subqueue, where the third subqueue to the sixth subqueue have the same priority.

The six subqueues will be described below, respectively.

The first subqueue is used to hold an Update message carrying a BGP route having a preset community attribute.

Since some services are required to be quickly converged, BGP routes for directing the forwarding of data streams of such services are to be quickly advertised to a peer device so that the peer device can forward the data streams as quickly as possible according to the BGP routes. In a BGP, the community attribute is used to indicate a characteristic of a BGP route, and therefore, the first subqueue holding an Update message carrying the BGP route with the preset community attribute may be set to have the highest priority. The preset community attribute is used to identify a corresponding BGP route as a BGP route to be quickly advertised.

A network manager may predefine the preset community attribute according to an actual requirement.

The second subqueue is used to hold an Update message carrying an aggregation route.

After an aggregation route is transmitted to a peer device, the peer device may forward a mass of data streams in time according to the aggregation route; therefore, the aggregation route also needs to be transmitted as priority. Accordingly, in an example of the present disclosure, the second subqueue for holding the Update message carrying the aggregation route is set to have the second-highest priority, thereby allowing faster convergence of forwarding paths.

The third subqueue is used to hold an Update message carrying a local route.

The fourth subqueue is used to hold an Update message carrying an external route.

The fifth subqueue is used to hold an Update message carrying a BGP route of which a mask belongs to a first mask area.

The sixth subqueue is used to hold an Update message carrying a BGP route of which a mask belongs to a second mask area.

There is no intersection existing between the first mask area and the second mask area. For example, the first mask area is 0 to X, and the second mask area is X to 32, where X may be preset.

At block S202, the routing device may classify the third subqueue to the sixth subqueue into one subqueue group.

At block S203, when a BGP route is to be advertised, the routing device may determine the type of the BGP route and place an Update message carrying the BGP route into a subqueue corresponding to the type.

For example, when the community attribute of the BGP route is determined as the preset community attribute, the Update message carrying the BGP route is placed into the first subqueue. When the BGP route is determined as the aggregation route, the Update message carrying the BGP route is placed into the second subqueue. When the BGP route is determined as the local route, the Update message carrying the BGP route is placed into the third subqueue. When the BGP route is determined as the external route, the Update message carrying the BGP route is placed into the fourth subqueue. When the mask of the BGP route is determined as belonging to the first mask area, the Update message carrying the BGP route is placed into the fifth subqueue. When the mask of the BGP route is determined as belonging to the second mask area, the Update message carrying the BGP route is placed into the sixth subqueue.

At block S204, during queue scheduling, the routing device may schedule the first subqueue, the second subqueue and the third subqueue to the sixth subqueue according to the SP scheduling algorithm. That is, the first subqueue is scheduled as priority, and any Update message placed into the first subqueue may be transmitted as priority, and the second subqueue would not be scheduled until no Update message is present in the first subqueue. Likewise, the third subqueue to the sixth subqueue can be scheduled only when no Update message is present in the second subqueue.

In addition, since the third subqueue to the sixth subqueue have the same priority and are put into the same subqueue group, the routing device R1 may schedule the third subqueue to the sixth subqueue according to the weight-based scheduling algorithm. For example, the ratio of the scheduling weights of the third subqueue, the fourth subqueue, the fifth subqueue and the sixth subqueue is 1:2:3:4, and the third subqueue, the fourth subqueue, the fifth subqueue and the sixth subqueue are scheduled in this order. The routing device R1 first fetches and transmits one Update message from the third subqueue, then fetches and transmits two messages from the fourth subqueue, then fetches and transmits three messages from the fifth subqueue and finally fetches and transmits four messages from the sixth subqueue. Afterwards, the routing device R1 may perform sequentially cyclic scheduling again from the third subqueue.

Apparently, the above-described method as shown in FIG. 2 may also be applied to the Route-refresh messages. In addition, in the block S201 of the method, the queue for holding the BGP messages to be transmitted may also be partitioned into five subqueues, four subqueues or even less subqueues, and may also be partitioned into seven subqueues, eight subqueues or even more subqueues. In the block S204, the weight-based scheduling algorithm such as WRR may also be used when different subqueues are scheduled, and the SP scheduling algorithm may also be used when different subqueues in the same subqueue group are scheduled.

Therefore, no limitations will be made to the number of the partitioned subqueues, to whether the subqueue group is formed, and to the number of the subqueues in a subqueue group in an example of the present disclosure. Likewise, no limitation will be made to the type of a BGP route carried in a BGP message placed into each subqueue. Additionally, in the example of the present disclosure, no limitations will be made to the scheduling algorithm for scheduling each subqueue as well as the scheduling algorithm for scheduling different subqueues in a subqueue group.

Based on the method as shown in FIG. 2, a routing device (R1) may establish a BGP neighbor relationship with another routing device (R2) first. When a local route is to be advertised to the routing device R2, the routing device R1 may place an Update message 1 carrying the local route into the third subqueue for subsequently transmitting it to the routing device R2 during queue scheduling.

Then, the routing device R1 may establish the BGP neighbor relationship with another routing device (R3). When an aggregation route is to be advertised to the routing device R3, the routing device R1 may place an Update message 2 carrying the aggregation route into the second subqueue for subsequently transmitting it to the routing device R3 during queue scheduling.

During queue scheduling, since the priority of the second subqueue is higher than that of the third subqueue, the CPU of the routing device R1 may schedule the second subqueue first. Thus, even in the case of a great load of the CPU, the CPU may still transmit the Update message 2 first. Accordingly, the aggregation route may be advertised to the routing device R3 as quickly as possible, and the routing device R3 may receive the aggregation route in time and then forward a mass of data streams in time according to the aggregation route.

Corresponding to the examples of the aforementioned method of transmitting a BGP message, the present disclosure also provides an example of an apparatus for transmitting a BGP message.

The example of an apparatus for transmitting a BGP message may also be applied to a routing device such as a router. The apparatus example may be implemented by software, and may also be implemented by hardware or a combination of software and hardware.

Figure 3:
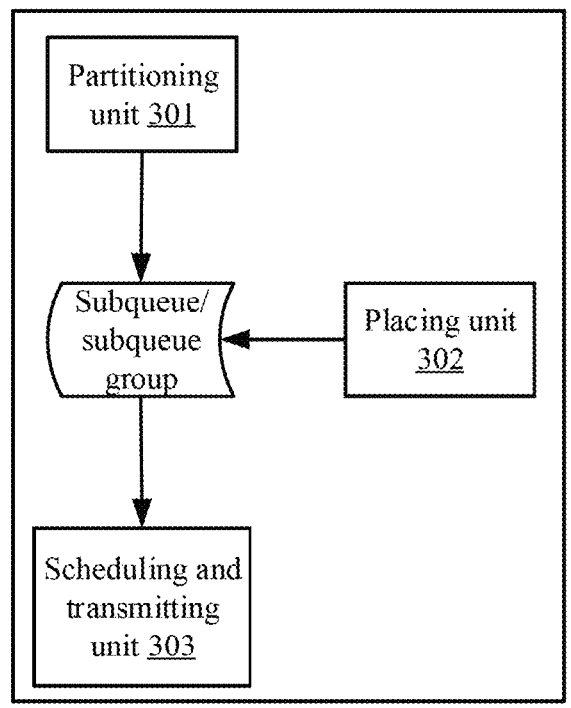
FIG. 3 illustrates a schematic structure diagram of an apparatus for transmitting a BGP message according to an exemplary example of the present disclosure.

FIG. 3 illustrates a schematic structure diagram of an apparatus for transmitting a BGP message according to an example of the present disclosure. The apparatus for transmitting a BGP message includes the following units: a partitioning unit 301, a placing unit 302 and a scheduling and transmitting unit 303.

The partitioning unit 301 is configured to partition a queue for holding BGP messages to be transmitted into more than two subqueues according to types of BGP routes, where each of the subqueues is used to hold a BGP message carrying a corresponding type of BGP route.

The placing unit 302 is configured to place, according to the type of a BGP route to be advertised, a BGP message carrying the BGP route into one of the more than two subqueues.

The scheduling and transmitting unit 303 is configured to select a target subqueue from the more than two subqueues according to a first scheduling algorithm and transmit a BGP message in the target subqueue.

The partitioning unit 301 is further configured to classify more than two said target subqueues into one subqueue group.

The scheduling and transmitting unit 303 is further configured to select a BGP message from each target subqueue in the subqueue group obtained by the partitioning unit 301 according to a second scheduling algorithm.

The first scheduling algorithm used by the scheduling and transmitting unit 303 is one of a SP scheduling algorithm and a weight-based scheduling algorithm; and the second scheduling algorithm is one of the SP scheduling algorithm and the weight-based scheduling algorithm.

The placing unit 302 is specifically configured to: place a BGP message carrying a BGP route to be advertised into a first subqueue when a community attribute of the BGP route is a preset community attribute; place a BGP message carrying a BGP route to be advertised into a second subqueue when the BGP route is an aggregation route; place a BGP message carrying a BGP route to be advertised into a third subqueue when the BGP route is a local route; place a BGP message carrying a BGP route to be advertised into a fourth subqueue when the BGP route is an external route; place a BGP message carrying a BGP route to be advertised into a fifth subqueue when a mask of the BGP route belongs to a first mask area; and place a BGP message carrying a BGP route to be advertised into a sixth subqueue when a mask of the BGP route belongs to a second mask area.

The priority of the first subqueue is higher than that of the second subqueue; the priority of the second subqueue is higher than that of the third subqueue; and the third subqueue, the fourth subqueue, the fifth subqueue and the sixth subqueue have the same priority.

The subqueues from the third subqueue to the sixth subqueue are classified into one subqueue group.

The BGP message include an Update messages and a Route-refresh message.

Details of the implementation process of the functions and effects of different units in the above-described apparatus may be seen from the implementation process of corresponding blocks in the above-described method, which will not be redundantly described herein.

Figure 4:
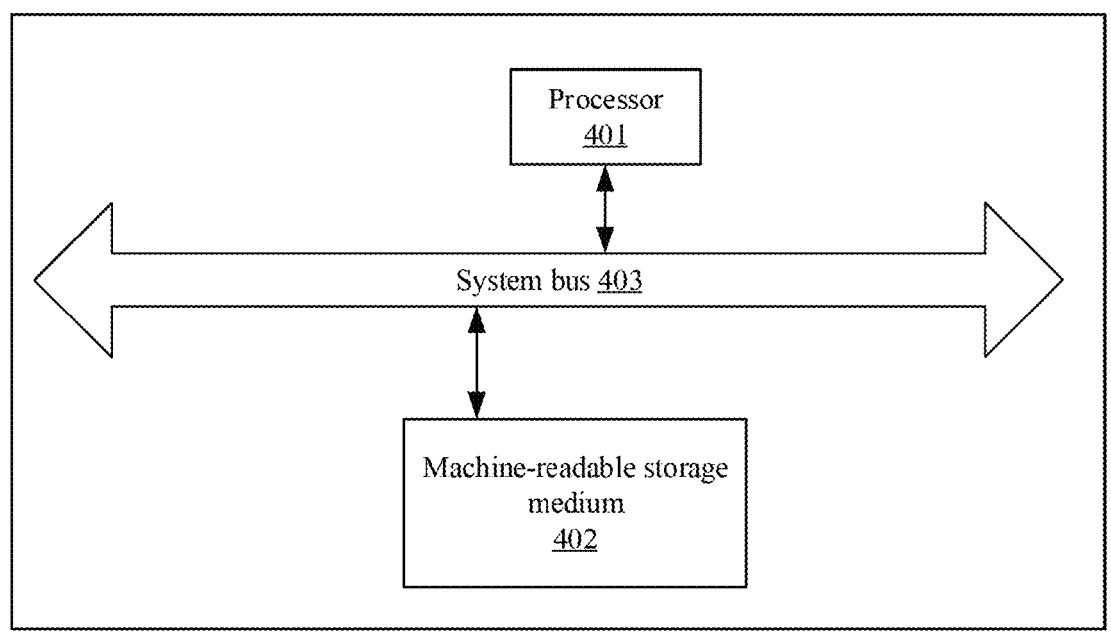
FIG. 4 illustrates a schematic diagram of a hardware structure of a routing device according to an exemplary example of the present disclosure.

FIG. 4 illustrates a schematic diagram of a hardware structure of a routing device according to an example of the present disclosure. The routing device includes a processor 401 and a machine-readable storage medium 402 that stores machine-executable instructions. The processor 401 may communicate with the machine-readable storage medium 402 via a system bus 403. Also, by reading and executing the machine-executable instructions on the machine-readable storage medium 402, the processor 401 may execute the above-described method of transmitting a BGP message. Typically, the routing device may also include other hardware according to the actual functions of the routing device, which will not be redundantly described herein.

The machine-readable storage medium 402 described herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state hard disk, or any type of storage disk.

For example, when the processor 401 reads and executes the machine-executable instructions on the machine-readable storage medium 402, the processor 401 is caused to execute the following operations:

partitioning a queue for holding BGP messages to be transmitted into more than two subqueues according to types of BGP routes, where each of the subqueues is used to hold a BGP message carrying a corresponding type of BGP route;

placing a BGP message carrying a BGP route to be advertised into one of the more than two subqueues according to the type of the BGP route;

selecting a target subqueue from the more than two subqueues according to a first scheduling algorithm; and transmitting a BGP message in the target subqueue.

When transmitting the BGP message in the target subqueue, the processor 401 is also caused by the machine-executable instructions to:

classify more than two said target subqueues into one subqueue group; and select a BGP message from each said target subqueue in the subqueue group according to a second scheduling algorithm.

The first scheduling algorithm is any one of a Strict Priority (SP) scheduling algorithm and a weight-based scheduling algorithm; and the second scheduling algorithm is any one of the SP scheduling algorithm and the weight-based scheduling algorithm.

When placing, according to the type of the BGP route to be advertised, the BGP message carrying the BGP route into one of the more than two subqueues, the processor 401 is also caused by the machine-executable instructions to:

place a BGP message carrying a BGP route to be advertised into a first subqueue when a community attribute of the BGP route is a preset community attribute;

place a BGP message carrying a BGP route to be advertised into a second subqueue when the BGP route is an aggregation route;

place a BGP message carrying a BGP route to be advertised into a third subqueue when the BGP route is a local route;

place a BGP message carrying a BGP route to be advertised into a fourth subqueue when the BGP route is an external route;

place a BGP message carrying a BGP route to be advertised into a fifth subqueue when a mask of the BGP route belongs to a first mask area; and place a BGP message carrying a BGP route to be advertised into a sixth subqueue when a mask of the BGP route belongs to a second mask area.

The priority of the first subqueue is higher than that of the second subqueue; the priority of the second subqueue is higher than that of the third subqueue; and the third subqueue, the fourth subqueue, the fifth subqueue and the sixth subqueue have the same priority.

The processor 401 is also caused by the machine-executable instructions to:

classify the third subqueue, the fourth subqueue, the fifth subqueue and the sixth subqueue into one subqueue group.

The BGP message includes an Update message and a Route-refresh message.

According to an example of the present disclosure, there is also provided a machine-readable storage medium, for example, the storage medium 402 that stores machine-executable instructions which, when invoked and executed, cause the processor 401 to:

partition a queue for holding BGP messages to be transmitted into more than two subqueues according to types of BGP routes, where each of the subqueues is used to hold a BGP message carrying a corresponding type of BGP route;

place, according to the type of a BGP route to be advertised, a BGP message carrying the BGP route into one of the more than two subqueues;

select a target subqueue from the more than two subqueues according to a first scheduling algorithm; and transmit a BGP message in the target subqueue.

When transmitting the BGP message in the target subqueue, the machine-executable instructions may also cause the processor 401 to:

classify more than two said target subqueues into one subqueue group; and select a BGP message from each said target subqueue in the subqueue group according to a second scheduling algorithm.

The first scheduling algorithm is any one of a Strict Priority (SP) scheduling algorithm and a weight-based scheduling algorithm; and the second scheduling algorithm is any one of the SP scheduling algorithm and the weight-based scheduling algorithm.

When placing, according to the type of the BGP route to be advertised, the BGP message carrying the BGP route into one of the more than two subqueues, the machine-executable instructions may also cause the processor 401 to:

place a BGP message carrying a BGP route to be advertised into a first subqueue when a community attribute of the BGP route is a preset community attribute;

place a BGP message carrying a BGP route to be advertised into a second subqueue when the BGP route is an aggregation route;

place a BGP message carrying a BGP route to be advertised into a third subqueue when the BGP route is a local route;

place a BGP message carrying a BGP route to be advertised into a fourth subqueue when the BGP route is an external route;

place a BGP message carrying a BGP route to be advertised into a fifth subqueue when a mask of the BGP route belongs to a first mask area; and place a BGP message carrying a BGP route to be advertised into a sixth subqueue when a mask of the BGP route belongs to a second mask area.

The priority of the first subqueue is higher than that of the second subqueue; the priority of the second subqueue is higher than that of the third subqueue; and the third subqueue, the fourth subqueue, the fifth subqueue and the sixth subqueue have the same priority.

The machine-executable instructions may also cause the processor 401 to:

classify the third subqueue, the fourth subqueue, the fifth subqueue and the sixth subqueue into one subqueue group.

The BGP message includes an Update message and a Route-refresh message.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It needs to be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of transmitting a Border Gateway Protocol (BGP) message, comprising:

partitioning, by a routing device, a queue for holding BGP messages to be transmitted into more than two subqueues according to types of BGP routes, wherein each of the subqueues is used to hold a BGP message carrying a corresponding type of BGP route;

placing, by the routing device, according to a type of a BGP route to be advertised, the subqueue-held BGP message carrying the BGP route into one of the more than two subqueues;

selecting, by the routing device, a target subqueue from the more than two subqueues according to a first scheduling algorithm; and transmitting, by the routing device, the subqueue-held BGP message in the target subqueue.

2. The method according to claim 1, wherein transmitting the subqueue-held BGP message in the target subqueue comprises:

classifying, by the routing device, more than two said target subqueues into one subqueue group; and selecting, by the routing device, the subqueue-held BGP message from each of more than two said target subqueues in the subqueue group according to a second scheduling algorithm.

3. The method according to claim 2, wherein the first scheduling algorithm is one of a Strict Priority (SP) scheduling algorithm and a weight-based scheduling algorithm; and the second scheduling algorithm is one of the SP scheduling algorithm and the weight-based scheduling algorithm.

4. The method according to claim 1, wherein placing, according to the type of the BGP route to be advertised, the subqueue-held BGP message carrying the BGP route into one of the more than two subqueues comprises:

placing, by the routing device, the subqueue-held BGP message carrying the BGP route to be advertised into a first subqueue when a community attribute of the BGP route is a preset community attribute;

placing, by the routing device, the subqueue-held BGP message carrying the BGP route to be advertised into a second subqueue when the BGP route is an aggregation route;

placing, by the routing device, the subqueue-held BGP message carrying the BGP route to be advertised into a third subqueue when the BGP route is a local route;

placing, by the routing device, the subqueue-held BGP message carrying the BGP route to be advertised into a fourth subqueue when the BGP route is an external route;

placing, by the routing device, the subqueue-held BGP message carrying the BGP route to be advertised into a fifth subqueue when a mask of the BGP route belongs to a first mask area; and placing, by the routing device, the subqueue-held BGP message carrying the BGP route to be advertised into a sixth subqueue when a mask of the BGP route belongs to a second mask area.

5. The method according to claim 4, wherein
a priority of the first subqueue is higher than the priority of the second subqueue;
the priority of the second subqueue is higher than the priority of the third subqueue; and
the third subqueue, the fourth subqueue, the fifth subqueue and the sixth subqueue have a same priority.

6. The method according to claim 5, wherein further comprising:
classifying, by the routing device, the third subqueue to the sixth subqueue into one subqueue group.

7. The method according to claim 1, wherein the subqueue-held BGP message includes an Update message and a Route-refresh message.

8. A routing device, comprising:
a processor; and
a machine-readable storage medium that stores machine-executable instructions, wherein, by reading and executing the machine-executable instructions, the processor is caused to:
partition a queue for holding Border Gateway Protocol (BGP) messages to be transmitted into more than two subqueues according to types of BGP routes, wherein each of the subqueues is used to hold a BGP message carrying a corresponding type of BGP route;
place, according to a type of a BGP route to be advertised, the subqueue-held BGP message carrying the BGP route into one of the more than two subqueues;
select a target subqueue from the more than two subqueues according to a first scheduling algorithm; and
transmit the subqueue-held BGP message in the target subqueue.

9. The routing device according to claim 8, wherein when transmitting the subqueue-held BGP message in the target subqueue, the processor is further caused by the machine-executable instructions to:
classify more than two said target subqueues into one subqueue group; and
select the subqueue-held BGP message from each of more than two said target subqueues in the subqueue group according to a second scheduling algorithm.

10. The routing device according to claim 9, wherein
the first scheduling algorithm is one of a Strict Priority (SP) scheduling algorithm and a weight-based scheduling algorithm; and
the second scheduling algorithm is one of the SP scheduling algorithm and the weight-based scheduling algorithm.

11. The routing device according to claim 8, wherein when placing, according to the type of the BGP route to be advertised, the subqueue-held BGP message carrying the BGP route into one of the more than two subqueues, the processor is further caused by the machine-executable instructions to:
place the subqueue-held BGP message carrying the BGP route to be advertised into a first subqueue when a community attribute of the BGP route is a preset community attribute;
place the subqueue-held BGP message carrying the BGP route to be advertised into a second subqueue when the BGP route is an aggregation route;
place the subqueue-held BGP message carrying the BGP route to be advertised into a third subqueue when the BGP route is a local route;
place the subqueue-held BGP message carrying the BGP route to be advertised into a fourth subqueue when the BGP route is an external route;
place the subqueue-held BGP message carrying the BGP route to be advertised into a fifth subqueue when a mask of the BGP route belongs to a first mask area; and
place the subqueue-held BGP message carrying the BGP route to be advertised into a sixth subqueue when a mask of the BGP route belongs to a second mask area.

12. The routing device according to claim 11, wherein
a priority of the first subqueue is higher than the priority of the second subqueue;
the priority of the second subqueue is higher than the priority of the third subqueue; and
the third subqueue, the fourth subqueue, the fifth subqueue and the sixth subqueue have a same priority.

13. The routing device according to claim 11, wherein the processor is further caused by the machine-executable instructions to:
classify the third subqueue, the fourth subqueue, the fifth subqueue and the sixth subqueue into one subqueue group.

14. The routing device according to claim 11, wherein the subqueue-held BGP message includes an Update message and a Route-refresh message.

* * * * *